United States Patent
Shimizu

(10) Patent No.: US 10,567,435 B2
(45) Date of Patent: Feb. 18, 2020

(54) APPARATUS THAT IS MANAGED IN ACCORDANCE WITH A SECURITY POLICY, CONTROL METHOD THEREOF, AND STORAGE MEDIUM

(71) Applicant: CANON KABUSHIKI KAISHA, Tokyo (JP)

(72) Inventor: Shota Shimizu, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 15/417,446

(22) Filed: Jan. 27, 2017

(65) Prior Publication Data
US 2017/0230422 A1  Aug. 10, 2017

(30) Foreign Application Priority Data

Feb. 5, 2016  (JP) ................. 2016-020729

(51) Int. Cl.
*H04L 29/06* (2006.01)
*G06F 21/00* (2013.01)
*G06F 21/57* (2013.01)

(52) U.S. Cl.
CPC .............. *H04L 63/20* (2013.01); *G06F 21/00* (2013.01); *G06F 21/572* (2013.01); *H04L 63/10* (2013.01)

(58) Field of Classification Search
CPC ....................................................... G06F 21/57
See application file for complete search history.

(56) References Cited

U.S. PATENT DOCUMENTS

| 2009/0235242 A1* | 9/2009 | Kawaguchi | ........ H04N 1/00002 717/168 |
| 2011/0047621 A1* | 2/2011 | Brando | ..................... G06F 8/61 726/24 |
| 2013/0198507 A1* | 8/2013 | Kasuya | ..................... G06F 1/24 713/100 |
| 2015/0264088 A1* | 9/2015 | Shimizu | .................. H04L 63/20 726/1 |

FOREIGN PATENT DOCUMENTS

JP         2009-187377 A     8/2009

\* cited by examiner

*Primary Examiner* — Jason K Gee
(74) *Attorney, Agent, or Firm* — Venable LLP

(57) ABSTRACT

A state of following a policy is maintained without troubling a person in the case where an operation setting relating to the policy is added by the update of software for an apparatus that is managed systematically under the policy. In the embodiment, the aspect is described in which the two kinds of generation information (currently being applied and at the time of policy setting) about software are saved and whether the policy adaptation processing is necessary is determined in accordance with the difference therebetween.

10 Claims, 12 Drawing Sheets

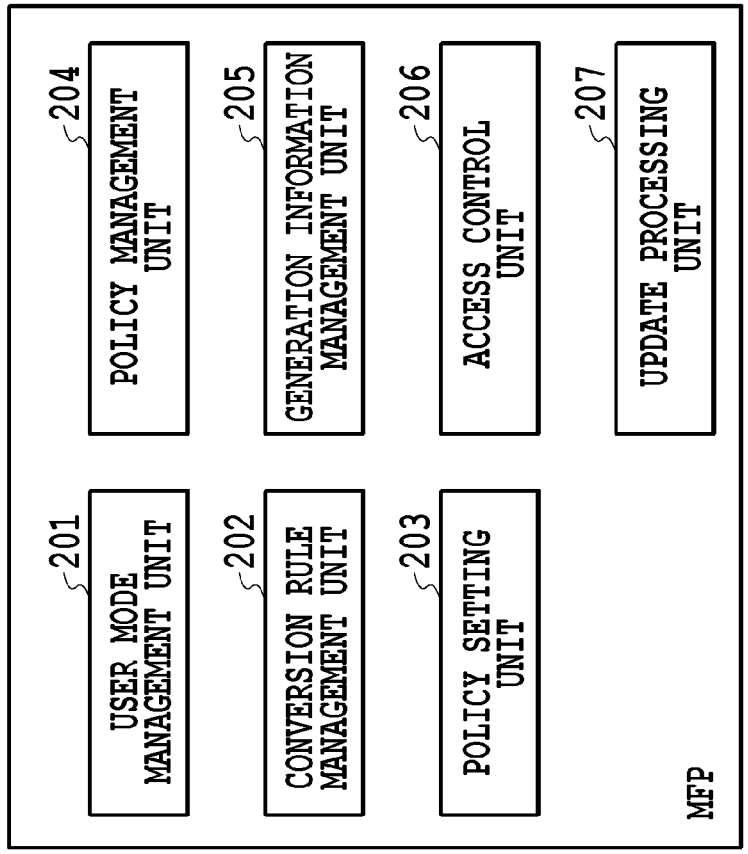
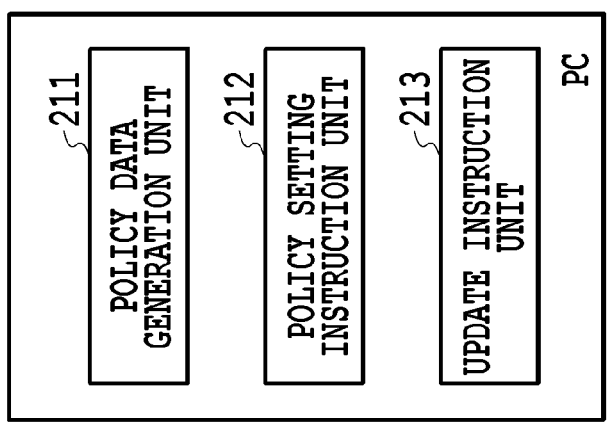
FIG.3B
FIG.3A

```
<?xml version="1.0"?>
<SECURITY POLICY>
<VERIFY THE SERVER CERTIFICATE WITHOUT
FAIL AT THE TIME OF TLS COMMUNICATION SETTING VALUE="ON"/>
</SECURITY POLICY>
```

501 — <SECURITY POLICY>
502 — <VERIFY THE SERVER CERTIFICATE WITHOUT FAIL AT THE TIME OF TLS COMMUNICATION SETTING VALUE="ON"/>
503 — </SECURITY POLICY>

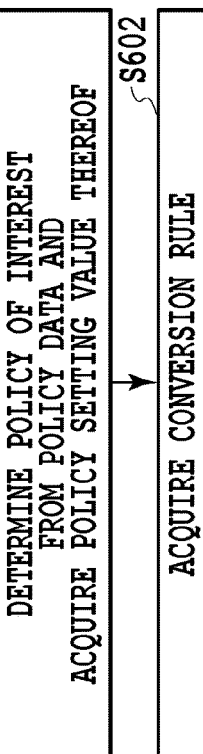
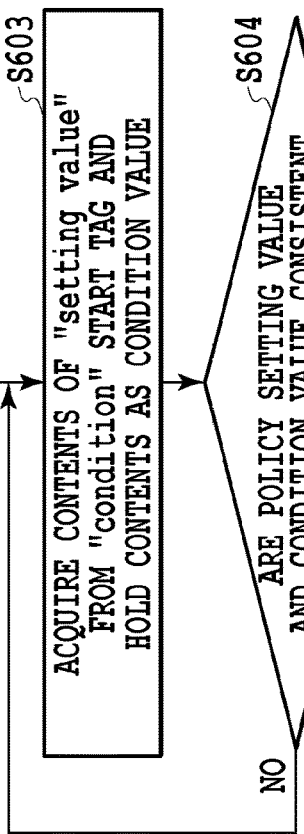
FIG.6
FIG.6A
FIG.6B
FIG.6A

```
<?xml version="1.0"encoding="UTF-8"? >
<CONVERSION RULE>
<SECURITY POLICY SECURITY POLICY NAME="VERIFY THE SERVER CERTIFICATE
WITHOUT FAIL AT THE TIME OF TLS COMMUNICATION">
  <CONDITION SETTING VALUE="OFF">
    <USER MODE USER MODE NAME="CHECK THE CERTIFICATE AT THE TIME OF SMTP TRANSMISSION"
    ACCESS CONTROL FLAG="OFF"/>
    <USER MODE USER MODE NAME="CHECK THE CERTIFICATE AT THE TIME OF POP RECEPTION"
    ACCESS CONTROL FLAG="OFF"/>
  </CONDITION>
  <CONDITION SETTING VALUE="ON">
    <USER MODE USER MODE NAME="CHECK THE CERTIFICATE AT THE TIME OF SMTP TRANSMISSION"
    ACCESS CONTROL FLAG="ON" SETTING VALUE="ON"/>
    <USER MODE USER MODE NAME="CHECK THE CERTIFICATE AT THE TIME OF POP RECEPTION"
    ACCESS CONTROL FLAG="ON" SETTING VALUE="ON"/>
  </CONDITION>
</SECURITY POLICY>
</CONVERSION RULE>
```

```xml
<?xml version="1.0" encoding="UTF-8"? >
<CONVERSION RULE>
<SECURITY POLICY SECURITY POLICY NAME="VERIFY THE SERVER CERTIFICATE WITHOUT FAIL AT THE TIME OF TLS COMMUNICATION">
    <CONDITION SETTING VALUE="OFF">
        <USER MODE USER MODE NAME="CHECK THE CERTIFICATE AT THE TIME OF SMTP TRANSMISSION" ACCESS CONTROL FLAG="OFF"/>
        <USER MODE USER MODE NAME="CHECK THE CERTIFICATE AT THE TIME OF POP RECEPTION" ACCESS CONTROL FLAG="OFF"/>
        <USER MODE USER MODE NAME="CHECK THE CERTIFICATE AT THE TIME OF WebDAV TRANSMISSION" ACCESS CONTROL FLAG="OFF"/>
    </CONDITION>
    <CONDITION SETTING VALUE="ON">
        <USER MODE USER MODE NAME="CHECK THE CERTIFICATE AT THE TIME OF SMTP TRANSMISSION" ACCESS CONTROL FLAG="ON" SETTING VALUE="ON"/>
        <USER MODE USER MODE NAME="CHECK THE CERTIFICATE AT THE TIME OF POP RECEPTION" ACCESS CONTROL FLAG="ON" SETTING VALUE="ON"/>
        <USER MODE USER MODE NAME="CHECK THE CERTIFICATE AT THE TIME OF WebDAV TRANSMISSION" ACCESS CONTROL FLAG="ON" SETTING VALUE="ON"/>
    </CONDITION>
</SECURITY POLICY>
</CONVERSION RULE>
```

FIG.7B

| USER MODE NAME | SETTING VALUE | ACCESS CONTROL FLAG |
|---|---|---|
| CHECK THE CERTIFICATE AT THE TIME OF SMTP TRANSMISSION | OFF | OFF |
| CHECK THE CERTIFICATE AT THE TIME OF POP RECEPTION | OFF | OFF |

FIG.8A

| USER MODE NAME | SETTING VALUE | ACCESS CONTROL FLAG |
|---|---|---|
| CHECK THE CERTIFICATE AT THE TIME OF SMTP TRANSMISSION | ON | ON |
| CHECK THE CERTIFICATE AT THE TIME OF POP RECEPTION | ON | ON |

FIG.8B

| USER MODE NAME | SETTING VALUE | ACCESS CONTROL FLAG |
|---|---|---|
| CHECK THE CERTIFICATE AT THE TIME OF SMTP TRANSMISSION | ON | ON |
| CHECK THE CERTIFICATE AT THE TIME OF POP RECEPTION | ON | ON |
| CHECK THE CERTIFICATE AT THE TIME OF WebDAV TRANSMISSION | OFF | OFF |

FIG.8C

| USER MODE NAME | SETTING VALUE | ACCESS CONTROL FLAG |
|---|---|---|
| CHECK THE CERTIFICATE AT THE TIME OF SMTP TRANSMISSION | ON | ON |
| CHECK THE CERTIFICATE AT THE TIME OF POP RECEPTION | ON | ON |
| CHECK THE CERTIFICATE AT THE TIME OF WebDAV TRANSMISSION | ON | ON |

FIG.8D

| CURRENTLY BEING APPLIED | ver. 1.0 |
|---|---|
| AT THE TIME OF SECURITY POLICY SETTING | ver. 0.0 |

FIG.9A

| CURRENTLY BEING APPLIED | ver. 1.0 |
|---|---|
| AT THE TIME OF SECURITY POLICY SETTING | ver. 1.0 |

FIG.9B

| CURRENTLY BEING APPLIED | ver. 2.0 |
|---|---|
| AT THE TIME OF SECURITY POLICY SETTING | ver. 1.0 |

FIG.9C

| CURRENTLY BEING APPLIED | ver. 2.0 |
|---|---|
| AT THE TIME OF SECURITY POLICY SETTING | ver. 2.0 |

FIG.9D

APPARATUS THAT IS MANAGED IN ACCORDANCE WITH A SECURITY POLICY, CONTROL METHOD THEREOF, AND STORAGE MEDIUM

BACKGROUND OF THE INVENTION

Field of the Invention

The present invention relates to a technique to manage an apparatus in a network environment in accordance with an information security policy.

Description of the Related Art

It is desirable for various devices connected to a network, for example, a client PC and various servers (file server and authentication server) to be operated in accordance with an information security policy determined for each office. The information security policy is the fundamental policy relating to the information security of the entire company and refers to an aggregation of the standard at the time of making use of information and the policy to prevent invasion from the outside and leakage of information (hereinafter, referred to as "security policy" or "policy" in this specification). On the operation of a PC or a server in a network environment, for example, restrictions, such as that user authentication is made indispensable at the time of operation and that encryption of the communication path is made indispensable, are imposed in order to prevent an unauthorized use and information leakage.

As the device that is connected to a network, mention is made of a peripheral, such as an MFP and a printer, in addition to the above-described PC and various servers. As the MFP in recent years, there exists one which has a function (BOX save function) to store image data and provide a file service to a PC, in addition to the functions, such as printing, copying, and FAX transmission, and the MFP has begun to play the same role as that of a server. Consequently, in order to implement a safe and secure office environment, the peripheral, such as an MFP and a printer, is required to follow a policy like a PC and a server.

In a conventional MFP, it is possible for an administrator to perform several settings (hereinafter, called user mode) relating to the operation of a device and to cause the device to operate in accordance with a security policy under the determination of the administrator.

However, with the setting in the conventional user mode, it is necessary to correctly set a large number of setting items and in the case where correct settings are not performed, the operation not following a security policy is actually allowed, and therefore, there is a possibility that the security of an office is threatened.

Japanese Patent Laid-Open No. 2009-187377 has disclosed a technique to cause a user to verify whether the MFP functions normally by displaying a list of the functions for which the operation needs to be checked to the user after the update of software installed in the MFP. With this system, it is possible to prevent a contradictory state between the setting value of the policy and the flag value of the operation setting from occurring by causing a user to check the setting value of the policy and the flag value relating to the operation setting that is affected by the policy and to perform the setting again in the case where there is a contradiction.

However, the above-described check work is a work that requires time and effort for an administrator and it is troublesome to perform the check work each time of the update of software. Further, there is a possibility that a human error that the setting is determined erroneously to be correct despite that the setting contradicts a policy, such as a check mistake of the policy setting value and an input mistake about the operation setting. Because of this, an object of the present invention is to maintain a state of following a policy without troubling a person in the case where an operation setting relating to the policy is added to an apparatus that is systematically managed under the policy due to the update of software.

SUMMARY OF THE INVENTION

The apparatus according to the present invention is an apparatus that is managed in accordance with a security policy under an environment connected to a network, including: a memory device that stores a set of instructions; and at least one processor that executes the instructions to: set, in accordance with policy data including contents of the security policy and information indicating whether or not to apply the contents of the security policy, access control information controlling an operation setting corresponding to a function of installed software and whether to permit a user to change the operation setting; determine, in a case where addition of the operation setting affected by the security policy is made accompanying execution of an update of the software, whether there is a contradiction between the information indicating whether or not to apply the contents of the security policy and the access control information about the added operation setting; and cause, in a case where it is determined that there is a contradiction, the information indicating whether or not to apply the contents of the security policy and the access control information about the added operation setting to be consistent with each other based on the setting.

Further features of the present invention will become apparent from the following description of exemplary embodiments (with reference to the attached drawings).

BRIEF DESCRIPTION OF THE DRAWINGS

FIG. 3A is a function block diagram showing a configuration of a processing unit related to policy control in a PC;

FIG. 3B is a function block diagram showing a configuration of a processing unit related to policy control in an MFP;

FIG. 7A and FIG. 7B are each an example of a conversion rule corresponding to a policy;

FIG. 8A to FIG. 8D are each a diagram showing an example of a user mode management list;

FIG. 9A to FIG. 9D are each a diagram showing an example of a generation information management list.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 2:
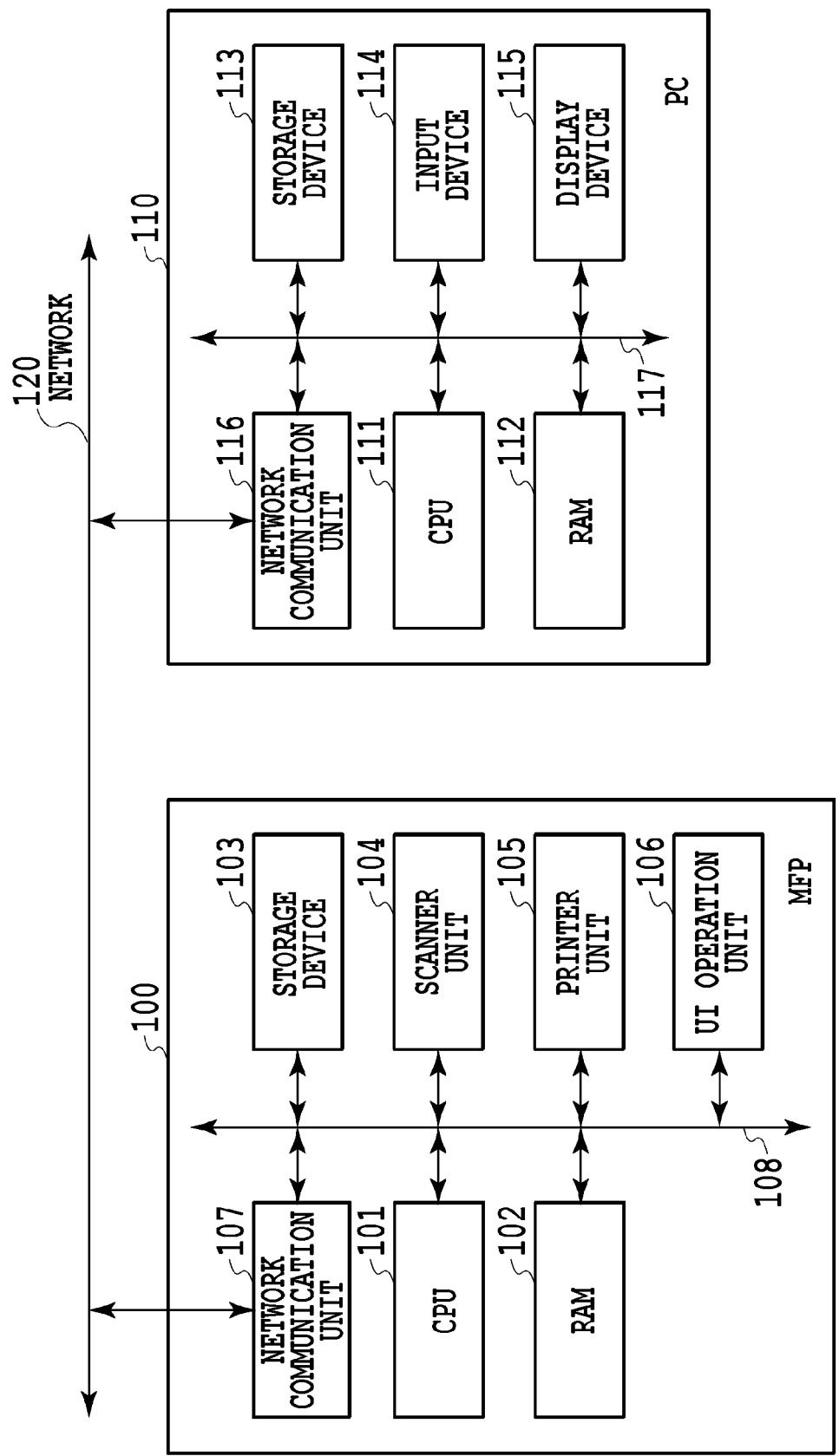
FIG. 2 is a diagram showing an example of a configuration of an information processing system.

FIG. 2 is a diagram showing an example of a configuration of an information processing system according to the present embodiment. The information processing system in FIG. 2 includes a multi function peripheral (MFP) 100 and a PC 110 and the MFP 100 and the PC 110 are connected to each other via a network 120. The devices making up the information processing system are not limited to those shown in the example in FIG. 2 and devices other than the MFP 100 and the PC 110, for example, a printer, a scanner, a mobile terminal, etc., may be used.

First, the configuration of the MFP 100 is explained. The MFP 100 includes a CPU 101, a RAM 102, a storage device 103, a scanner unit 104, a printer unit 105, a UI operation unit 106, and a network communication unit 107 and each unit is connected with one another via a bus 108. The network communication unit 107 is an interface to perform communication with an external device, such as the PC 110, via the network 120. The UI operation unit 106 is a user interface to receive an input operation of a user for performing various settings by displaying the state of the MFP 100. The CPU 101 is a processor to perform arithmetic operation processing for various kinds of control, such as image processing of print data and scan processing, and centralizedly controls the MFP 100. The RAM 102 is a work area for the CPU 101 to perform various kinds of arithmetic operation processing and is also made use of to temporarily store program codes, image data, etc., The storage device 103 is a large-capacity storage device to store software, image data, etc., and is, for example, an HDD or the like. The scanner unit 104 is a read processing unit configured to optically read a document that is set on a document table, not shown schematically. The printer unit 105 is a printing processing unit configured to print an image on a printing medium, such as paper, by an electrophotographic method or an ink jet method in accordance with image data to be printed.

In the above-described configuration, for example, the copy function is implemented as follows. First, in response to copy instructions via the UI operation unit 106, under the control of the CPU 101, the scanner unit 104 generates image data by reading a document that is set on a document table, not shown schematically. The generated image data is sent to the printer unit 105 after being subjected to necessary image processing and an image is formed on a printing medium, such as paper, and output. Further, the transmission function of a scanned file is implemented as follows. First, in response to transmission instructions of a scanned file via the UI operation unit 106, under the control of the CPU 101, the scanner unit 104 generates image data by reading a document that is set on a document table, not shown schematically. The generated image data is transmitted to the outside as a scanned file from the network communication unit 107 via the network 120 after being subjected to predetermined format conversion. At the time of transmitting the image data to the outside via the network 120, a protocol, such as SMTP, POP, and WebDAV, is used. SMTP is the abbreviated name of "Simple Mail Transfer Protocol". POP is the abbreviated name of "Post Office Protocol". WebDAV is the abbreviated name of "Web-based Distributed Authoring and Versioning".

Next, the PC 110 is explained. The PC 110 includes a CPU 111, a RAM 112, a storage device 113, an input device 114, a display device 115, and a network communication unit 116 and each unit is connected via a bus 117. The network communication unit 116 is an interface to perform communication with an external device, such as the MFP 100, via the network 120. The CPU 111 is a processor that centralizedly controls the PC 110. The RAM 112 is a work area for the CPU 111 to perform various kinds of arithmetic operation processing. The storage device 113 is a large-capacity storage device to store software, image data, etc., and for example, is an HDD or the like. The input device 114 refers to a mouse, a keyboard, etc., for a user, such as an administrator, to perform various input operations. The display device 115 includes a liquid crystal monitor or the like and displays various screens for delivering information necessary for a user. It may also be possible for the display device 115 having a touch panel function to also include the function of the input device 114.

FIG. 3A is a function block diagram showing a configuration of a processing unit related to policy control in the PC 110.

A policy data generation unit 211 generates policy data including a character string (policy name) specifying the contents of a policy and information (e.g., binary data represented by ON/OFF) indicating whether or not to apply the contents of the policy. As described previously, this policy data is data in a format that does not depend on each individual device (here, MFP 100). The generated policy data is stored in the storage device 113.

A policy setting instruction unit 212 gives setting instructions to cause a target device (here, MFP 100) under a network environment to make a transition into a state of following a policy or on the contrary, to make a transition into a state of not following a policy. At the time of the setting instructions, the above-described policy data is sent to a target device via the network communication unit 116.

An update instruction unit 213 gives instructions to update software in charge of the main control of a target device under a network environment to the target device. At the time of the update instructions, update data (e.g., data of all software in the most recent version or data of a difference from the previous version) is sent to the target device via the network communication unit 116. Then, in the update data, a conversion rule, to be described later, may also be included.

FIG. 3B is a function block diagram showing a configuration of a processing unit related to policy control in the MFP 100.

A user mode management unit 201 saves and manages a character string specifying the contents of various operation settings (hereinafter, also described as "user mode (Umode)") within the MFP 100, a setting value that specifies whether to validate the contents, and access control information (in the present embodiment, the above-described flag) in the storage device 103. The character string that specifies the contents of a user mode corresponds to, for example, "check the certificate at the time of SMTP transmission", "check the certificate at the time of POP reception", "check the certificate at the time of WebDAV transmission", etc., in FIG. 1 described previously. The character strings "check the certificate at the time of SMTP transmission" and "check the certificate at the time of POP reception" are items to set whether or not to verify the certificate that is sent from the communication destination in the case where SMTP or POP using TLS is used for the transmission of a scanned file. The character string "check the certificate at the time of WebDAV transmission" is an item to set whether or not to verify the certificate that is sent from the communication destination in the case where the MFP 100 uses WebDAV using TLS for the transmission of a scanned file. TLS is the abbreviated name of "Transport Layer Security" and is one kind of protocol that implements safe communication by encrypting the communication.

A conversion rule management unit 202 saves and manages a conversion rule for converting policy data received from the PC 110 into the above-described operation setting (user mode) unique to the MFP 100 in the storage device 103. This conversion rule is created in advance by a developer as part of software and stored in the storage device 113. There is also a case where the conversion rule is received from the PC 110 as part of the above-described update data.

A policy setting unit 203 performs processing to reflect a policy in the MFP 100 in accordance with policy setting instructions from the PC 110. Specifically, the policy setting unit 203 performs processing to convert the received policy data into the setting value of the operation setting (user mode) of the policy setting unit 203 itself and the access control flag value, and to set and update them based on the above-described conversion rule prepared in advance.

A policy management unit 204 saves and manages a setting value (policy setting value) to determine whether to bring about a state where the MFP 100 follows a policy in association with a character string (policy name) representing the contents of the policy. The policy setting value is set in accordance with the policy data.

A generation information management unit 205 saves and manages generation information (version information) on control software of the MFP 100 in the storage device 103. Here, it is assumed that the numerical value indicating the generation of the generation information increases in such a manner that "ver. 0.0", "ver. 1.0", "ver. 2.0" and so forth, in accordance with an increase in the number of functions possessed by the software. The generation information managed by the generation information management unit 205 includes two kinds of generation information: generation information indicating the version of software currently being applied (hereinafter, "current generation information") and generation information indicating the version of software at the point in time of the reflection of a policy (hereinafter, "setting-time generation information").

An access control unit 206 controls user access in an attempt to change the setting value of the user mode based on the access control information. In the present embodiment, in the case where the flag value is ON, the user access is limited so that the setting value of the user mode cannot be changed by any method other than the method of the policy data and in the case where the flag value is OFF, the access is not limited and it is made possible for a user to freely change the setting value of the user mode.

An update processing unit 207 updates the software currently installed (stored in the storage device 103 or the like) by using the above-described update data that is sent from the PC 110 along with the update instructions. At this time, in the case where a conversion rule corresponding to a new function is included in the update data, the conversion rule managed by the conversion rule management unit 202 is also updated. Further, in the case where the software is updated in the state of following the policy, the update processing unit 207 also performs processing to make it possible to continuously make use of the MFP without contradicting the policy. Details of this processing will be described later.

In the present embodiment, explanation is given on the assumption that the function of each processing unit shown in FIG. 3A and FIG. 3B is made up of software, but part of the function may be made up of hardware.

Figure 1:
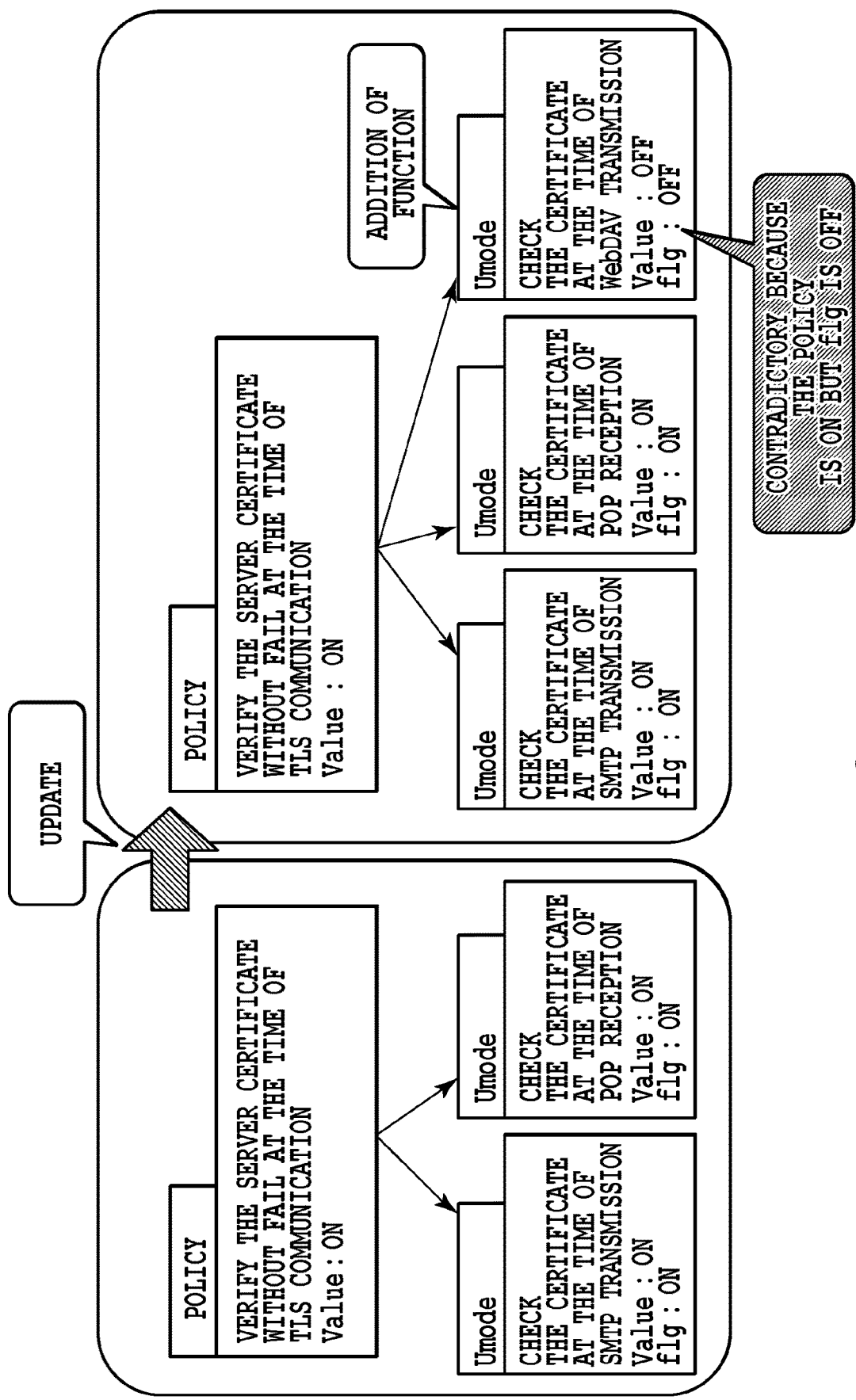
FIG. 1 is a diagram showing a state where "WebDAV transmission function" is added accompanying an update of software.

Here, the problem of the present embodiment is reviewed again. It is necessary for the MFP employing the system disclosed in Patent Document 1 and placed in the state of following the policy to be maintained in the same state without being changed. As a measure for this, there is a method of providing a limit to access from a user for the operation setting performed based on the policy data. Specifically, information for controlling access is added to each individual operation setting and at the timing of the completion of the setting of the operation setting based on the policy data, the user access is limited. As information for controlling access, there is a flag that prohibits user access, for example, in the case of "ON", and permits user access in the case of "OFF" (releases the access limit). In the case where access control is performed by using the flag such as this, while the flag is ON, it is not possible to change the contents of the operation setting by any method other than the method of changing the setting by using the policy data. Due to this, it is made possible to systematically manage security based on the policy. In the system in which the user access to the operation setting is limited by the method such as this, there is a case where an operation setting that is affected by the policy is added accompanying the addition of a new function due to the update of software installed in the MFP. The update of the flag value is based on the policy data, and therefore, in the case where the above-described update is performed in the state of following the policy, the flag value of the operation setting to be added newly is not updated. That is, the state enters the OFF state, which is the default value of the flag at the time of the addition of a new function. In this case, despite the state of following the policy (state where the policy setting value is ON), the flag value of the access control is OFF, i.e., a contradictory state, and therefore, the MFP is excluded from the systematic management of security based on the policy. FIG. 1 is a diagram showing a state where a "WebDAV transmission function" is added accompanying the update of software. As the result of the update being performed in the state where the policy setting value is ON, there occurs a contradiction to the flag value (OFF) for access control relating to the operation setting (Umode) of the newly added "WebDAV transmission function".

Figure 4A:
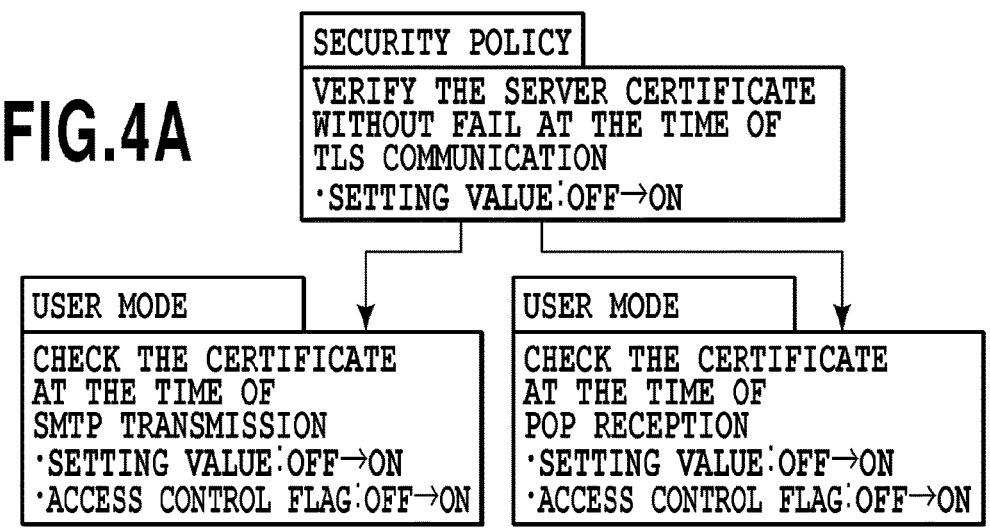
FIG. 4A and FIG. 4B are each a diagram explaining the way the setting of a user mode is changed by policy data.
Figure 4B:
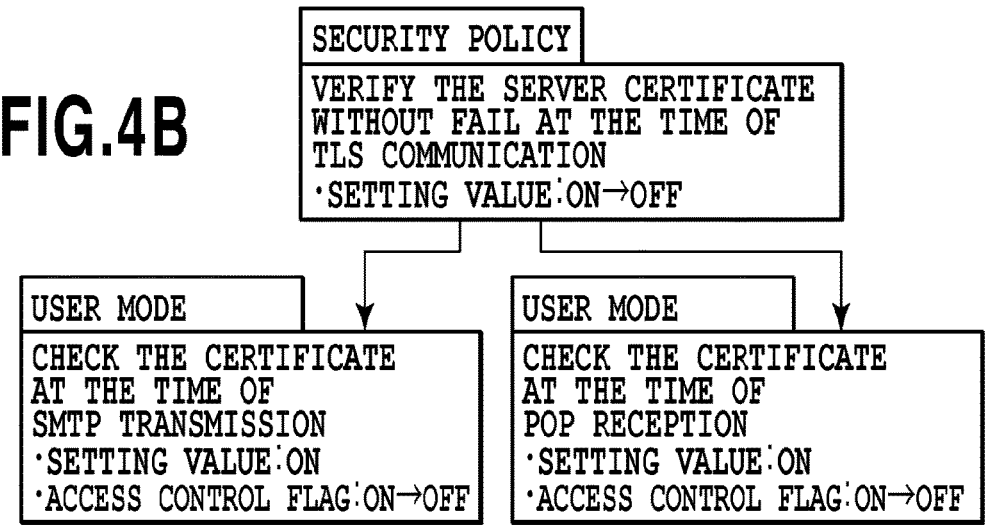

The above-described contents are further explained step by step. FIG. 4A and FIG. 4B each show the way the setting of the user mode is changed by the policy data transmitted from the PC 110. The policy data in the case of FIG. 4A indicates that the setting value of the policy "verify the server certificate without fail at the time of TLS communication" is changed from OFF to ON. In the case where the policy setting value is changed to ON as above, the setting values of the user modes "check the certificate at the time of SMTP transmission" and "check the certificate at the time of POP reception" affected by the policy change from OFF to ON and at the same time, the access control flag value also changes from OFF to ON. As described above, the flag value switches to ON (from OFF, which is the default value) in accordance with the policy setting value changing to ON, and therefore, the MFP makes a transition into the state of following the policy and it is no longer possible for a user to freely change the setting value of the user mode.

In contrast to this, the policy data in the case of FIG. 4B indicates that the setting value of the policy "verify the server certificate without fail at the time of TLS communication" is changed from ON to OFF. In the case where the policy setting value changes to OFF as described above, the access control flag value also changes to OFF, and therefore, it is made possible for a user to freely change the setting value of the user mode.

Figure 4C:
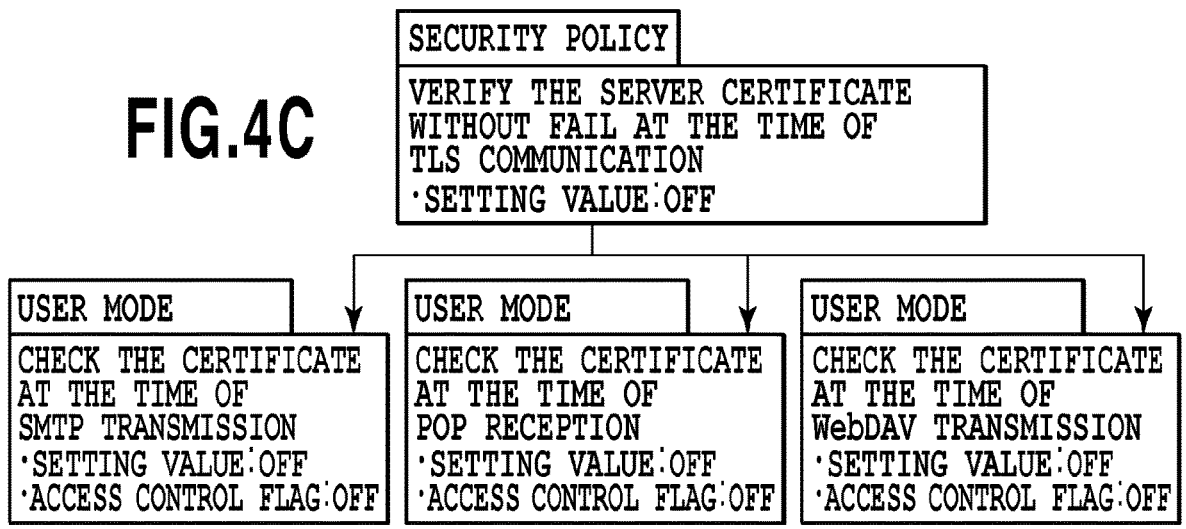
FIG. 4C is a diagram showing the way a user mode affected by a policy is newly added by an update of software.

FIG. 4C shows the way "check the certificate at the time of WebDAV transmission" is newly added as the user mode that is affected by the policy "verify the server certificate without fail at the time of TLS communication" by the update of software. In this example, the policy setting value at the point in time of the update of software is OFF and all the setting values and the flag values relating to the three user modes are OFF. In this case, as in FIG. 4A described above, in accordance with the policy setting value changing to ON, the setting values of all the user modes including "check the certificate at the time of WebDAV transmission" that is added change from OFF to ON. As described above, in the case where the policy setting value is OFF at the point in time of the update of software accompanied by the addition of the user mode (i.e., new function), the problem of the contradiction between the policy setting value and the access control flag value of the user mode of the present invention does not occur.

However, in the case of the state of following the policy (policy setting value is ON) at the point in time of the update of software accompanied by the addition of the user mode, the above-described problem of contradiction occurs. Originally, in the case where the policy setting value of the policy "verify the server certificate without fail at the time of TLS communication" is ON, the setting value of the user mode "check the certificate at the time of WebDAV transmission" and the flag value thereof need to be ON. However, by the update of software alone, the setting value of the user mode and the flag value are not updated in accordance with the policy. Because of this, the problem of the present invention in that the policy and the access control flag value of the user mode contradict each other occurs.

In the example in FIG. 4A, as the policy setting value changes from OFF to ON, the setting values of all the user modes change from OFF to ON. However, whether the setting value of the user mode also changes accompanying the change of the policy setting value depends on whether the description specifying the user mode is represented in the affirmative sentence or in the negative sentence. What is important is that in the case where the policy becomes valid, the setting value of the user mode is forced to be consistent with the policy. The level of the information security and the convenience of a user are generally in a trade-off relationship. Because of this, in many cases, the default setting value of the user mode at the time of the addition of a new function is a lower security level (OFF in the example described above). As is obvious from FIG. 1 and FIG. 4C, the present embodiment also premises this, but the default setting value of the user mode may be a higher security level. In this case, the update in the state where the policy setting value is ON does not bring about the problem of contradiction because the setting value of the newly added user mode is also ON. However, the access control flag value is changed to ON only in the case where the policy should be followed, and therefore, the default value thereof is always OFF. Because of this, the above-described problem of contradiction occurs at least in the relationship with the flag value.

Subsequently, as to a measure to solve the above-described problem, i.e., the contradiction between the policy setting value and the access control flag value of the user mode at the time of the update of software, explanation is given by taking the information processing system shown in FIG. 1 as an example.

First, processing in the PC 110 to bring the MFP 100 under the network environment into the state of following the policy is explained.

Figures 5A, 5B:
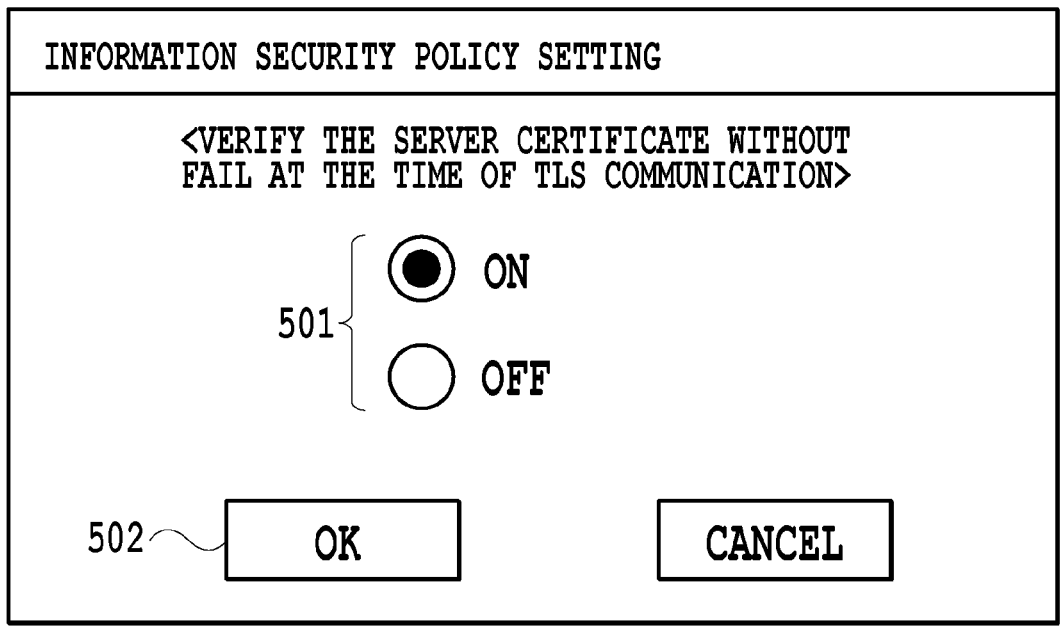
FIG. 5A is a diagram showing an example of a policy setting screen as a UI screen for generating policy data.
FIG. 5B is a diagram showing an example of policy data.

As described previously, in the case where the MFP 100 is caused to follow the policy, the policy data is used. This policy data is generated by an administrator inputting necessary information on a UI screen for policy setting, which is displayed on the display unit 115, in the PC 110. FIG. 5A is a diagram showing an example of a policy setting screen as a UI screen for generating policy data. The policy setting screen shown in FIG. 5A is a screen example for generating data of the policy "verify the server certificate without fail at the time of TLS communication". In the present specification, for the sake of convenience of explanation, as the contents of the policy, "verify the server certificate without fail at the time of TLS communication" is explained exclusively, but it is needless to say that a policy with more contents exists actually. The policy "verify the server certificate without fail at the time of TLS communication" is the policy that specifies verification of the server certificate in the case where each communication function of the MFP 100 makes use of TLS.

An administrator who desires to cause the MFP 100 to follow the policy "verify the server certificate without fail at the time of TLS communication" selects ON by a radio button 501 and presses down an OK button 502 on the policy setting screen in FIG. 5A. Due to this, the policy generation unit 211 generates policy data in accordance with the contents (in this case, the MFP 100 is caused to follow the policy) input on the policy setting screen. FIG. 5B shows an example of the policy data represented in the XML format. The policy data in FIG. 5B has the contents to give instructions to set the policy setting value indicating whether or not to apply the policy "verify the server certificate without fail at the time of TLS communication" to "ON". The policy data thus generated is stored in the storage device 113. The format of policy data is not limited to the XML format and may be another data format. Here, the example is explained in which the setting value of the policy is selected by using the radio button, but another example may be accepted in which it is possible to select the setting value of the policy from among a plurality of alternatives by entering an input in the text field or by checking a checkbox.

Then, in response to the instructions by an administrator to the effect that the MFP 100 is caused to follow the policy, the policy setting instruction unit 212 reads the policy data from the storage device 113 and transmits the policy data to the MFP 100 via the network communication unit 116. In the present embodiment, the configuration is supposed in which the policy data is transmitted based on the explicit instructions from an administrator using the input device 114, but it may also be possible to design a configuration in which the policy data is transmitted automatically at the point in time of the generation thereof.

Figure 6B:
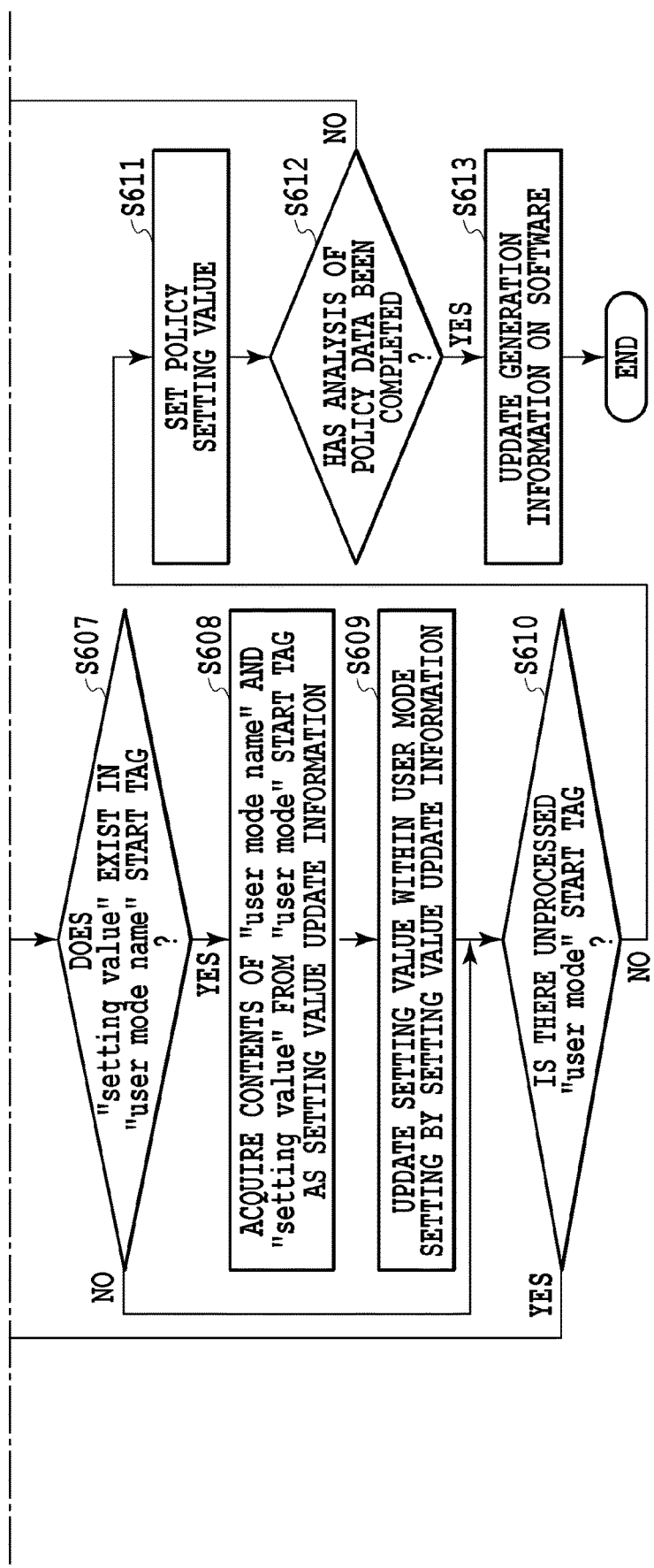
FIG. 6 is a diagram showing a relationship of FIGS. 6A and 6B, and FIGS. 6A and 6B are flowcharts showing a flow of processing at the time of applying policy data.

Subsequently, processing (policy setting processing) to cause the MFP 100 to make a transition into a state of following a policy (or a state of not following a policy) by using policy data is explained. FIGS. 6A and 6B are flowcharts showing a flow of the policy setting processing. This processing is implemented by the CPU 104 executing a predetermined program read from the storage device 103 onto the RAM 102.

The policy data received from the PC 110 along with the instructions to set a policy is stored temporarily in the RAM 102 and then the processing at each step below is started. In the following, explanation is given on the assumption that the policy data shown in FIG. 5B described previously is received.

At step 601, the policy setting unit 203 determines a policy of interest from the policy data. Specifically, first, the policy setting unit 203 determines the policy located in the element next the start tag of the policy data stored in the RAM 102 to be a policy of interest and acquires and holds the setting value of the determined policy of interest (stores in the RAM 102). In the case of the policy data shown in FIG. 5B, the policy "verify the server certificate without fail at the time of TLS communication" is determined to be the policy of interest and "ON" is acquired and held as the policy setting value thereof. In the case where a plurality of policies exists within the policy data, each policy is determined to be the policy of interest in order and the processing at each of the subsequent steps is repeated.

At step 602, the policy setting unit 203 acquires a conversion rule corresponding to the determined policy of interest from the conversion rule management unit 202. In the conversion rule, in which user mode the setting value and the access control flag value should be changed in accordance with the policy setting value included in the policy data is described. FIG. 7A is an example of the conversion rule corresponding to the policy "verify the server certificate without fail at the time of TLS communication". Actually, the conversion rules exist for more policies and the conversion rule corresponding to the policy of interest is searched for and acquired from the conversion rules. By the conversion rule such as this, it is made possible to convert the policy data independent of a specific model type into the user mode, which is the operation setting dependent on a specific model type. In the case where the conversion rule corresponding to the determined policy of interest does not exist, the processing becomes erroneous processing.

At step 603, the policy setting unit 203 acquires the attribute value of "setting value" from the start tag of "condition" within the conversion rule and holds the attribute value as the condition value (stores in the RAM 102). In the conversion rule in FIG. 7A, first, the setting value "OFF" of a "condition" start tag 701 is acquired and held as the condition value.

At step 604, the policy setting unit 203 compares the policy setting value acquired and held at step 601 with the condition value acquired and held at step 603 and determines whether both are consistent with each other. In the case where both are consistent with each other, the processing proceeds to step 605. On the other hand, in the case where both are not consistent with each other, the processing returns to step 603 and the policy setting unit 203 acquires the contents of "setting value" from the next "condition" start tag and holds the contents of "setting value" as the condition value, and performs again the determination processing at step 604. In the case of the present embodiment, in the first routine, the policy setting value acquired and held at step 601 is "ON" and the condition value acquired and held at step 603 is "OFF". In this case, it is determined that both are not consistent with each other and the processing proceeds to the next routine. In the next routine, the condition value acquired and held at step 603 becomes "ON", and therefore, it is determined that both are consistent with each other and the processing proceeds to the next step 605.

At step 605, the policy setting unit 203 determines a start tag of interest of the "user mode" start tags within "condition" determined to be consistent with the policy setting value and acquires the contents of "user mode name" and "access control flag" therefrom. Then, the policy setting unit 203 holds the acquired contents as flag update information (stores in the RAM 102). In the present embodiment, in the first routine, with a start tag 703 as the start tag of interest, the user mode name "check the certificate at the time of SMTP transmission" and the flag value "ON" are acquired, respectively, and held as the flag update information. Then, in the next routine, with a start tag 704 as the start tag of interest, the user mode name "check the certificate at the time of POP reception" and the flag value "ON" are acquired, respectively, and similarly held as the flag update information.

At step 606, the policy setting unit 203 updates the flag value of the user mode having the name that coincides with the user mode name in the above-described flag update information within the user mode management list under the management of the user mode management unit 201 in accordance with the flag update information. FIG. 8A and FIG. 8B each show an example of the user mode management list that is managed by the user mode management unit 201 and the setting value indicating valid/invalid of each operation setting and the access control flag value are saved in association with the user mode name representing the contents of each operation setting. FIG. 8A shows the state before the update and FIG. 8B shows the state after the update and it is known that the flag value that is "OFF" before the update changes to "ON" after the update.

At step 607, the policy setting unit 203 determines whether "setting value" exists in the start tag of interest of "user mode". In the case where it is determined that "setting value" exits, the processing proceeds to step 608. On the other hand, in the case where it is determined that "setting value" does not exist, the processing proceeds to step 610.

At step 608, the policy setting unit 203 acquires the contents of "user mode name" and "setting value" from the start tag of interest of "user mode" and holds the contents as setting value update information (stores in the RAM 102). In the present embodiment, in the first routine, with the start tag 703 as the start tag of interest, the user mode name "check the certificate at the time of SMTP transmission" and the setting value "ON" are acquired, respectively, and held as the setting value update information. Then, in the next routine, with the start tag 704 as the start tag of interest, the user mode name "check the certificate at the time of POP reception" and the setting value "ON" are acquired, respectively, and similarly held as the setting value update information.

At step 609, the policy setting unit 203 updates the setting value of the user mode having the name that coincides with the user mode name in the above-described setting value update information within the above-described user mode management list in accordance with the setting value update information. By this update processing, the setting value that is "OFF" before the update is changed to "ON" after the update (see FIG. 8A and FIG. 8B described previously).

At step 610, the policy setting unit 203 determines whether there is an unprocessed start tag of "user mode". In the case where the next element of the conversion rule is not the completion tag of "condition", it is determined that there is an unprocessed "user mode" start tag and the processing returns to step 605 and the processing is continued by setting the next start tag as the start tag of interest. On the other hand, in the case where the next element of the conversion rule is the completion tag of "condition", it is determined that the processing has been completed for all the "user mode" start tags and the processing proceeds to step 611.

At step 611, the policy setting unit 203 instructs the policy management unit 204 to set the provisional policy setting value held at step 601 as the definite policy setting value that is applied to control. In response to this, the policy management unit 204 reads the policy setting value stored in the RAM 102 and stores the policy setting value in the storage device 103 in association with the policy name. In the present embodiment, the policy name "verify the server certificate without fail at the time of TLS communication" and the policy setting value "ON" associated with each other are stored in the storage device 103.

At step 612, the policy setting unit 203 determines whether or not the analysis of the received policy data has been completed. Specifically, the next element of the policy data stored in the RAM 102 is read and whether or not the element is the completion tag (in the present embodiment, the completion tag 503) is determined. In the case where the element is the completion tag of the policy data, the processing proceeds to step 613. On the other hand, in the case where the element is not the completion tag of the policy data but the start tag of the next policy, the processing returns to step 601 and the processing is continued by determining the policy in the next element to be the policy of interest.

At step 613, the policy setting unit 203 updates the management list of the generation information on the software. FIG. 9A and FIG. 9B each show an example of the generation information management list that is managed by the generation information management unit 205. In the generation information management list, the two kinds of information are saved: current generation information indicating the version of the software currently being applied and setting-time generation information indicating the version of the software at the point in time of the execution of the most recent policy setting processing. Then, FIG. 9A shows the state of the generation information management list before the update and FIG. 9B shows that after the update. The update is performed by the generation information management unit 205 instructed to update the list overwriting "ver. 0.0", which is the contents of "at the time of security policy setting" corresponding to the setting-time generation information, by "ver. 1.0", which is the contents of "currently being applied" corresponding to the current generation information.

The above is the contents of the policy setting processing in the MFP 100.

Next, explanation is given to processing to make it possible to make use of the MFP 100 continuously without contradicting the policy even in the case where the software is updated for the MFP 100 in the state of following the policy. As the premise of this processing, the software is updated in the state where the policy is valid (policy setting value is "ON"). The update is performed by the following procedure.

1) An administrator gives instructions to update software for the MFP 100 in the PC 110.
2) In response to the above-described instructions, the update instruction unit 213 of the PC 110 transmits data of software whose version is different from that currently being applied in the MFP 100 to the MFP 100 via the network communication unit 116.
3) In the MFP 100 having received the data of the software, the update processing unit 207 performs the update by using the received data and restarts the MFP 100.

In the following, explanation is given on the assumption that "WebDAV transmission function" that is affected by the policy "verify the server certificate without fail at the time of TLS communication" is added accompanying the update of the software. FIG. 8C shows the state of the user mode management list after the completion of the update and FIG. 9C shows the state of the generation information management list after the completion of the update, respectively.

Figure 10:
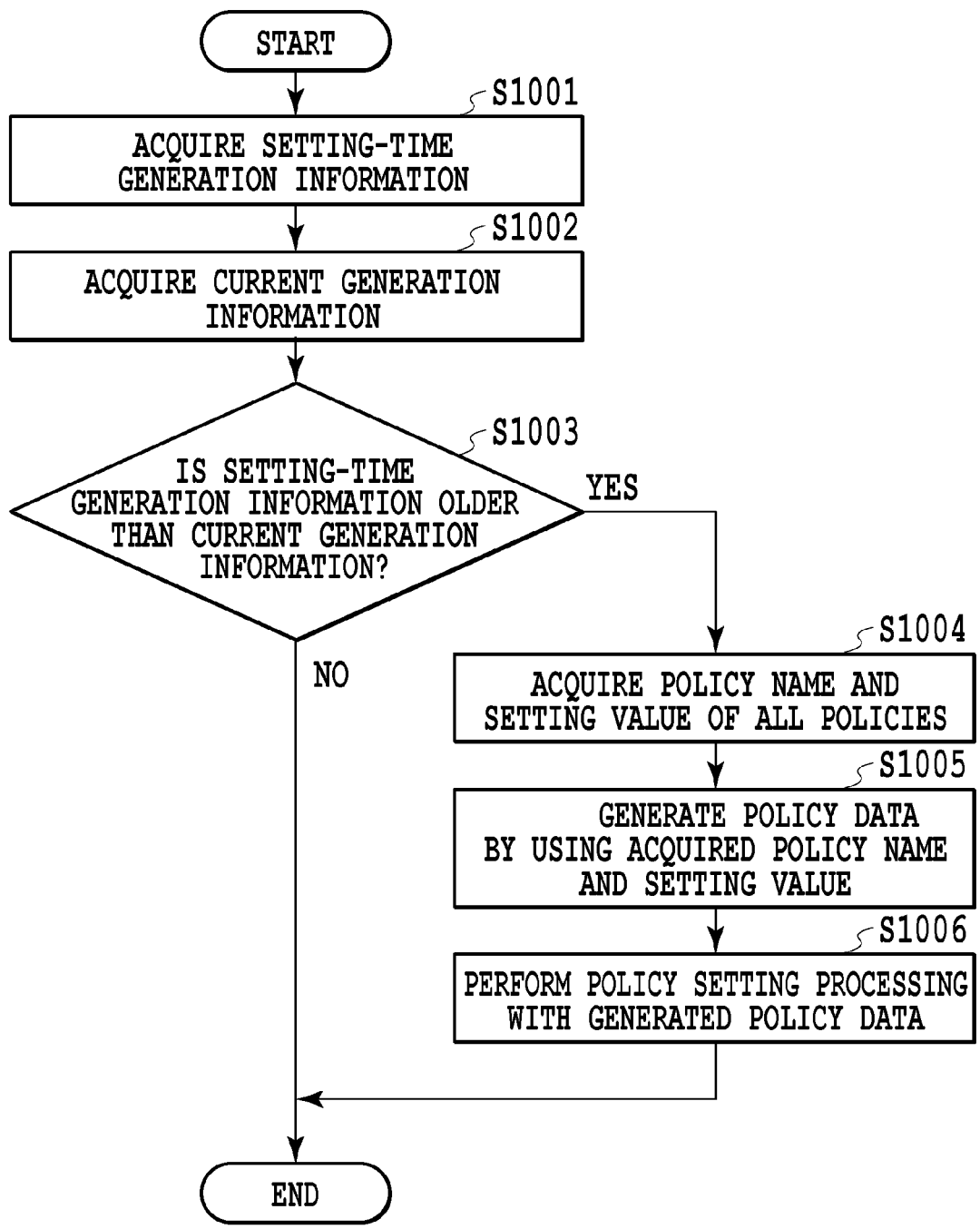
FIG. 10 is a flowchart showing a flow of processing to make it possible to make use of an MFP in a state of not contradicting a policy, which is performed after an update.

FIG. 10 is a flowchart showing a flow of processing to make it possible to make use of the MFP 100 in the state of not contradicting a policy, which is performed after the update. This processing is also implemented by the CPU 104 executing a predetermined program read from the storage device 103 onto the RAM 102.

During the activation processing after the completion of the update, at step 1001, the update processing unit 207 acquires the setting-time generation information (here, "ver.1.0"), which is the generation information at the time of policy setting, from the generation information management list via the generation information management unit 205. The acquired setting-time generation information is stored in the RAM 102.

At step 1002, the update processing unit 207 acquires the current generation information (here, "ver.2.0"), which is the generation information on the software currently being applied due to the update, from the generation information management list via the generation information management unit 205. The acquired current generation information is stored in the RAM 102.

At step 1003, the update processing unit 207 compares the acquired setting-time generation information with the acquired current generation information and determines which generation information (version) is new. In the case where the setting-time generation information is older than the current generation information, the processing proceeds to step 1004. On the other hand, in the case where the version is the same or the setting-time generation information is newer, the present processing is exited. Here, the setting-time generation information is "ver.1.0" and the current generation information is "ver.2.0" (see the generation information management list in FIG. 9C), and therefore, the processing proceeds to the processing at step 1004. In the present embodiment, the aspect is explained in which the versions themselves are compared to determine which is new, but for example, it may also be possible to allocate a numerical value in accordance with the version and to determine which is new by comparing the numerical values.

At step 1004, the update processing unit 207 acquires the policy name and the corresponding policy setting value of all the policies via the policy management unit 204. The policy names and the policy setting values that are acquired (here, "verify the server certificate without fail at the time of TLS communication" and "ON") are stored in the RAM 102.

At step 1005, the update processing unit 207 generates policy data by using the policy name and the policy setting value thereof acquired at step 1004. The generated policy data is stored in the RAM 102.

At step 1006, the update processing unit 207 gives instructions to perform the policy setting processing based on the policy data generated at step 1005 to the policy setting unit 203 in order to cause the policy setting value and the flag value of the user mode to be consistent with each other. Upon receipt of the instructions, the policy setting unit 203 performs the policy setting processing in accordance with the flowcharts in FIGS. 6A and 6B described previously by using the policy data stored in the RAM 102. In order to distinguish from the normal policy setting processing that is performed irrespective of the update, the policy setting processing that is performed at this step is called "policy adaptation processing" for the sake of convenience. FIG. 7B is an example of the conversion rule corresponding to the policy "verify the server certificate without fail at the time of TLS communication" that is referred to in the policy adaptation processing in the case where the user mode "check the certificate at the time of WebDAV transmission" is added accompanying the update. As the result of the policy adaptation processing, the state is brought about where the contents of the policy and the contents of the access control information about the operation setting ("user mode") that is added by the update are consistent with each other (here, both are "ON"). Further, the generation information management list is updated to that as shown in FIG. 9D by "ver.1.0", which is the contents of "at the time of security policy setting", being overwritten by "ver.2.0", which is the contents of "currently being applied".

The above is the contents of the processing to make it possible to make use of the MFP 100 in the state of not contradicting the policy after the update. In the present embodiment, prior to the policy adaptation processing, the generation of the policy data is performed, but it may also be possible to save the policy data used at the time of the most recent policy setting processing in the storage device 103 and to make use of the policy data again.

According to the present embodiment, even in the case where a new function is added by the update of software, it is possible to maintain the operation setting of an apparatus under a network environment in the state of not contradicting a policy. Further, the policy adaptation processing is performed only in the case where it is determined that the policy adaptation processing is necessary based on generation information on software, and therefore, it is possible to reduce the period of time during which the target apparatus cannot be used due to the processing.

Modification Example

In the present embodiment, the aspect is described in which the two kinds of generation information (currently being applied and at the time of policy setting) about software are saved and whether the policy adaptation processing is necessary is determined in accordance with the difference therebetween. In place of using the generation information on software, it may also be possible to save the number of functions corresponding to each version of the software or the number of user modes (operation settings) corresponding to the functions and to determine the necessity of the policy adaptation processing by checking the change in the number.

Specifically, at step 613 of the flow in FIG. 6B, the number of functions (or user modes) in the software currently being applied and the number of functions (or user modes) in the software at the point in time of performing the policy setting processing are saved in place of the generation information. Then, in the flow in FIG. 10, the number of functions (or user modes) at the time of policy setting is acquired at step 1001 and the number of functions (or user modes) in the software currently being applied is acquired at step 1002. In the case where the results of the comparison between both the numbers indicate that the number of functions (or user modes) at the time of policy setting is smaller (Yes at step 1003), the processing proceeds to the processing at step 1004 and the subsequent steps. In the example described previously, with an increase in the number of functions and the number of user modes corresponding to the functions from two to three due to the update as a trigger, the policy adaptation processing is performed.

Further, in the present embodiment, the configuration is such that in which the generation of the policy data is performed by the PC, but a configuration may be accepted in which the policy data is generated within the MFP and the policy data is applied as it is. Furthermore, it may also be possible to design a configuration in which the role of the PC is performed by a specific MFP and the policy data generated within the specific MFP is transmitted to another MFP.

It may also be possible to incorporate a configuration in which the right of an operator is authenticated or it is authenticated that the policy data is policy data from a specific PC and the operation setting by the policy data is permitted only in the case where the authentication has succeeded in the method described in the present embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where an operation setting relating to a policy is added by the update of software for an apparatus that is systematically managed under the policy, it is possible to maintain the state of following the policy without troubling a person.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-020729 filed Feb. 5, 2016, which is hereby incorporated by reference wherein in its entirety.

What is claimed is:

1. An apparatus that is managed in accordance with a security policy under an environment connected to a network, the apparatus comprising:
a policy setting unit configured to set access control information, wherein the access control information is set in accordance with policy data including contents of the security policy and an instruction indicating whether or not to apply the contents of the security policy, and wherein a policy conversion rule applies the instruction to the access control information so that the access control information controls an operation setting corresponding to a function of installed software and whether to permit a user to change the operation setting;
an update processing unit configured to update the software; and
a storing unit configured to store version information of software including first and second version information, wherein the first version information indicates a version of software currently being applied to the apparatus and the second version information indicates a version of software at the time of performing the policy setting processing by the policy setting unit most recently before the software currently being applied,
wherein a new condition for an operation setting is added to the policy conversion rule in a case where the update processing unit updates the software, and
wherein the policy setting unit:
confirms the first and second version information stored in the storing unit after the software is updated, and
in a case where it is confirmed that the second version information of the software is older than the first version information of the software, repeats policy setting processing by the policy setting unit according to the policy data and the policy conversion rule to which the new condition for an operation setting is added.

2. The apparatus according to claim 1, wherein the version information about the software is generation information of the software.

3. The apparatus according to claim 1, wherein policy setting processing by the policy setting unit is repeated in a case where there is a change in a number of functions of the software.

4. The apparatus according to claim 3,
wherein the change in the number of functions is such that a number of functions in software indicated by the second version information is smaller than a number of functions in software indicated by the first version information.

5. The apparatus according to claim 1, wherein policy setting processing by the policy setting unit is repeated in a case where there is a change in a number of operation settings corresponding to functions of the software.

6. The apparatus according to claim 5,
wherein the change in the number of operation settings is such that a number of operation settings corresponding to functions in software indicated by the second version information is smaller than a number of operation settings corresponding to functions in software indicated by the first version information.

7. The apparatus according to claim 1, wherein the access control information is a flag representing whether or not to permit the change by a user, and wherein repeating of the policy setting processing by the policy setting unit acts to change a value of the flag into a value representing that the change by a user is not permitted.

8. The apparatus according to claim 1, wherein the update and the setting in accordance with the security policy are performed in accordance with instructions from another apparatus connected via the network.

9. A control method of an apparatus that is managed systematically in accordance with a security policy under an environment connected to a network, the control method comprising:
performing policy setting processing so as to set access control information, wherein the access control information is set in accordance with policy data including contents of the security policy and an instruction indicating whether or not to apply the contents of the security policy, and wherein a policy conversion rule applies the instruction to the access control information so that the access control information controls an operation setting corresponding to a function of installed software and whether to permit a user to change the operation setting;
updating the software; and
storing version information of software including first and second version information, wherein the first version information indicates a version of software currently being applied to the apparatus and the second version information indicates a version of software at the time of performing the policy setting processing by the policy setting unit most recently before the software currently being applied,
wherein a new condition for an operation setting is added to the policy conversion rule in a case where the software is updated in the updating step, and
wherein the policy setting processing:
confirms the first and second version information stored in the storing unit after the software is updated, and
in a case where it is confirmed that the second version information of the software is older than the first version information of the software, policy setting processing is repeated according to the policy data and the policy conversion rule to which the new condition for an operation setting is added.

10. A non-transitory computer readable storage medium storing a program for causing a computer to perform a control method of an apparatus that is managed systematically in accordance with a security policy under an environment connected to a network, wherein the program causes the computer to perform the control method comprising:
performing policy setting processing so as to set access control information, wherein the access control information is set in accordance with policy data including contents of the security policy and an instruction indicating whether or not to apply the contents of the security policy, and wherein a policy conversion rule applies the instruction to the access control information so that the access control information controls an operation setting corresponding to a function of installed software and whether to permit a user to change the operation setting;
updating the software; and
storing version information of software including first and second version information, wherein the first version information indicates a version of software currently being applied to the apparatus and the second version information indicates a version of software at the time of performing the policy setting processing by the policy setting unit most recently before the software currently being applied, wherein a new condition for an operation setting is added to the policy conversion rule in a case where the software is updated in the updating step, and wherein the policy setting processing:
confirms the first and second version information stored in the storing unit after the software is updated, and
in a case where it is confirmed that the second version information of the software is older than the first version information of the software, policy setting processing is repeated according to the policy data and the policy conversion rule to which the new condition for an operation setting is added.

* * * * *